United States Patent [19]

Litz

[11] 4,244,496
[45] Jan. 13, 1981

[54] SIDE MOUNT FOR CARRYING A LUGGAGE BOX OR THE LIKE ON A MOTORCYCLE

[76] Inventor: Reuben Litz, 543-19th Ave. North, South St. Paul, Minn. 55075

[21] Appl. No.: 114,123

[22] Filed: Jan. 21, 1980

[51] Int. Cl.³ .......................... B62J 9/00; B62J 11/00
[52] U.S. Cl. ............................. 224/32 R; 224/32 A; 224/39
[58] Field of Search ................ 224/273, 39, 31, 40, 224/42.38

[56] References Cited

U.S. PATENT DOCUMENTS

| 2,783,927 | 3/1957 | Harley | 224/32 R |
| 3,795,354 | 3/1974 | Stippich | 224/32 R X |
| 3,934,770 | 1/1976 | Larsen | 224/33 R |
| 4,081,117 | 3/1978 | Crane | 224/32 A X |

Primary Examiner—Steven M. Pollard
Attorney, Agent, or Firm—Jacobson and Johnson

[57] ABSTRACT

A carrying plate is attached to the rear side of a motorcycle frame through an attachment plate and has an outwardly extending ledge on which rests a luggage box or the like and the box is releasably clamped to the carrying plate along the upper edge of the carrying plate.

5 Claims, 3 Drawing Figures

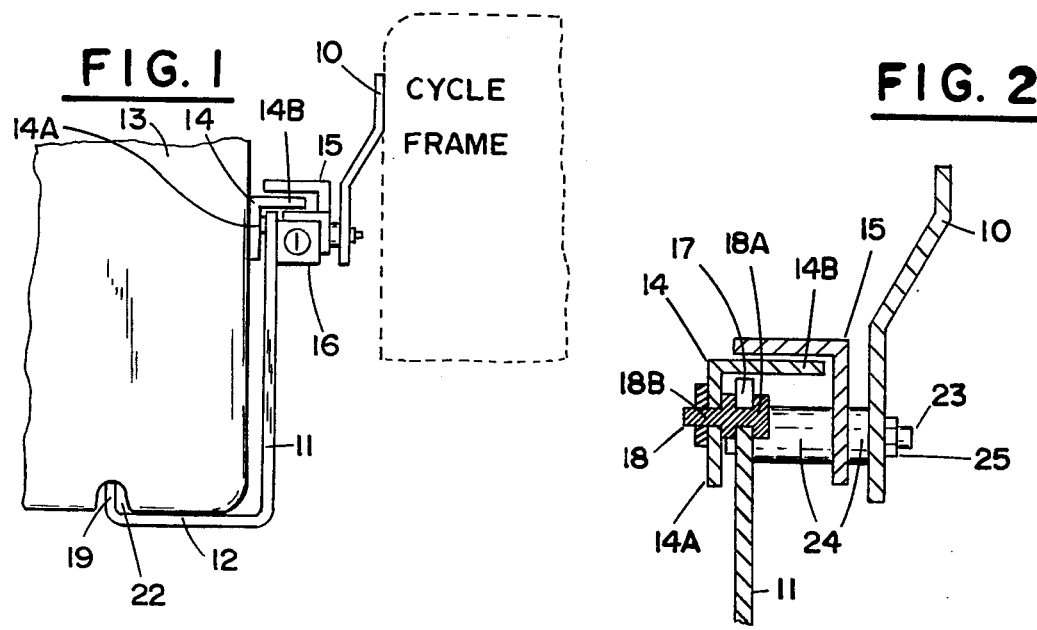
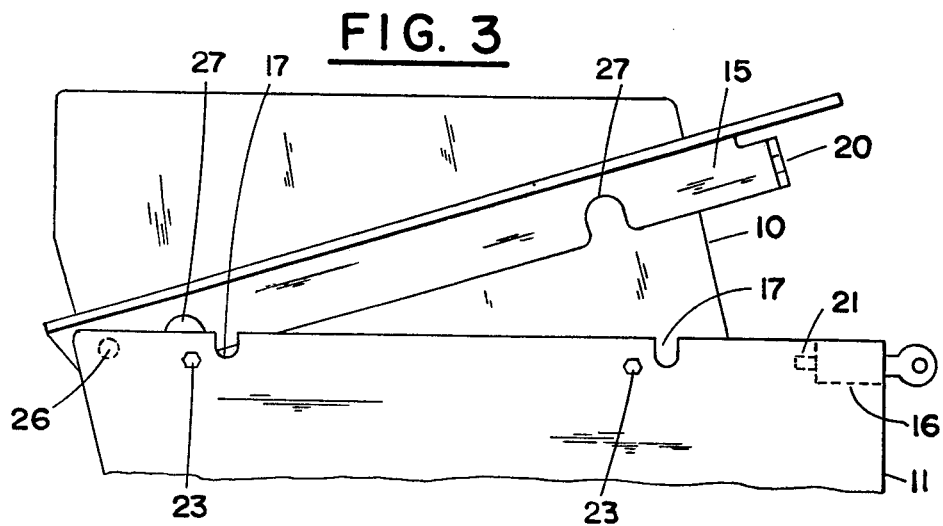

SIDE MOUNT FOR CARRYING A LUGGAGE BOX OR THE LIKE ON A MOTORCYCLE

FIELD OF THE INVENTION

This invention is directed toward providing flexible and convenient means for securely mounting luggage on a touring motorcycle yet providing a conveniently operable simple mechanism for quickly releasing the luggage from its mounting so that it can easily be removed when not in use such as when the motorcycle is parked over night. The mount and the luggage which it carries are located so as to not interfere with the operation or stability of the motorcycle or to not block the view of the motorcycle operator.

SUMMARY OF THE INVENTION

A metal attachment plate is attached at the rear to the main frame of the motorcycle and is flared outward and extends downward. A carrying plate is rigidly attached to the attachment plate but spaced outwardly therefrom and extends further downward with its lower end bent further outward to form a ledge. The luggage box which is to be carried rests on the ledge and has a right angle bracket member attached along one side adjacent the carrying plate. One side of the right angle bracket extends over the top edge of the carrying plate toward the attaching plate. A clamping arm which is pivotally attached at one end is located just above the gap between the attaching plate and the carrying plate and is pivoted downward to clamp the bracket in the area between the carrying plate and attaching plates. The clamping arm is releasably locked in the clamping position. Preferably, the ledge on the carrying plate has a lip which engages a recess on the outer bottom of the luggage box to prevent the box from sliding outward. A further feature is the provision of recesses along the upper edge of the carrying plate adapted to receive the shaft of pins which are attached to the angle bracket and which have heads which rest just inside the carrying plate when the pin shafts are in the recesses to further protect against the luggage box slipping outwardly. For security, preferably the releasable locking means comprises a key-operated plunger which engages an opening in the locking arm when the arm is in the closed position. When the luggage box is mounted and being carried it is securely held in position yet when arriving at a stop for the night, for example, the motorcyclist merely has to release the locking mechanism, lift the locking arm and remove the luggage box.

DESCRIPTION OF THE DRAWING

FIG. 1 is an elevational view of a preferred embodiment of the invention as viewed from the front of a motorcycle with which the mechanism is used;

FIG. 2 is a somewhat exploded, detailed section of the FIG. 1 view; and

FIG. 3 shows a preferred embodiment of the invention in elevation as viewed looking toward the side of the motorcycle to which it is attached but with the luggage box removed.

DESCRIPTION OF THE PREFERRED EMBODIMENT

An attachment plate 10 made of metal, preferably steel, is rigidly attached near its upper end by any convenient means such as welding or bolting to the rear side of the main frame of a motorcycle, not shown. The attachment plate is located generally opposite the rear wheel of the cycle. The attachment plate 10 is formed to flare outwardly away from the side of the motorcycle and downwardly. Toward its lower end a carrying plate 11, which is spaced outwardly from the attachment plate 10, extends further downward and has a lower ledge 12 which the bottom of a luggage box 13 rests on. The carrying plate 11 is rigidly attached to the attachment plate 10 in some convenient fashion. In the illustrated preferred embodiment a pair of bolts 23 having suitable spacer sleeves 24 and threaded nuts 25 hold the carrying plate 11 to the attachment plate 10 in a spaced-apart relationship. A right angle bracket member 14 has one side 14A rigidly attached in some convenient fashion such as by riveting or bolting, not shown, to the side wall of the luggage box 13. The bracket member 14 is located so that when the luggage box 13 rests on the ledge 12 the other side 14B of bracket 14 extends over the top edge of the carrying plate 11 toward the attachment plate 10 in the space between the latter two. An elongated arm 15 is pivotally attached at one end by a pin 26 to either the carrying plate 11 or attachment plate 10 so that it can be swung downward to hold the bracket side 14B in its location between the attachment plate 10 and the carrying plate 11 so that the luggage box 13 cannot be lifted off the ledge 12. The notches 27 in the clamping arm 15 are merely to accommodate the sleeves 24 to permit the arm 15 to be swung completely downward into its holding position. The front end of the arm 15 has an opening 20 in which is inserted a plunger 21 to lock the arm in the holding position. Preferably, the plunger is key-operated so that it can be quickly released if necessary but yet requires a special key for security purposes. Although in the drawing the lock mechanism is located in a manner to be operated from the front, this is merely a matter of choice and the locking mechanism could engage the clamping arm 15 from the side if desired.

As an added feature a pin 18 can be attached to side 14A of the bracket 14 to extend inward toward the carrying plate 11 with a retaining head 18A at the end of the shaft 18B. A recess 17 at the top edge of carrying plate 11 is provided for each pin 18 and the shaft 18B is slipped into the recess 17 to provide protection against the luggage box 13 slipping outward from the mount. Also, the ledge 12 of the holding plate 11 may have an upwardly turned lip 19 to engage a groove or slot 22 in the outer bottom wall of the box 13 to further protect against the box slipping off the ledge.

I claim:

1. A mount for removably carrying a luggage box or bag by a motorcycle, comprising:
   a. an attachment plate (10) adapted to be fixedly attached to the main frame of a motorcycle extending downwardly and outwardly from its attachment;
   b. a carrying plate (11) fixedly attached to and spaced outwardly from and extending downwardly from said attachment plate the lower part of said carrying plate bent outwardly to form a ledge (12) for a luggage box (13) to rest on;
   c. a right angle bracket member (14) adapted to be fixedly attached along its one side (14A) to a side of a luggage box with the other side of the bracket (14B) extending over the top edge of the carrying plate toward the attachment plate in the space between the carrying plate and the attachment plate;
d. a clamping arm (15) pivotally attached at one end adapted to be swung downward toward the space between the attachment plate and the carrying plate for holding the bracket member in place; and
e. means (16) for releasably locking the clamping arm in the holding position.

2. The invention as described in claim 1 wherein said carrying plate has recess means (17) at its upper edge and said bracket member has pin means (18) for resting in said recess means with heads on said pins located adjacent the inner surface of the carrying plate.

3. The invention as described in claim 1 wherein the ledge on the carrying plate has an upward extending lip (19) for engaging a recess (22) in the outer underside of the luggage box.

4. The invention as described in claim 1 wherein said clamping arm has an opening (20) and said releasable locking means comprises a key-operated plunger (21) attached to the carrying plate for releasably engaging said opening when the clamping arm is in the holding position.

5. The invention as described in claim 1 wherein the attachment plate is attached to the rear side of the motorcycle frame.

* * * * *